(12) United States Patent
Kinoshita et al.

(10) Patent No.: US 7,087,894 B2
(45) Date of Patent: Aug. 8, 2006

(54) OPTICAL SYSTEM FOR REINFORCING OPTICAL TWEEZERS CAPTURING FORCE

(75) Inventors: Kazuhiko Kinoshita, Aichi (JP); Megumi Shio, Kanagawa (JP)

(73) Assignee: Japan Science and Technology Agency, Saitama-ken (JP)

( * ) Notice: Subject to any disclaimer, the term of this patent is extended or adjusted under 35 U.S.C. 154(b) by 84 days.

(21) Appl. No.: 10/498,317

(22) PCT Filed: Sep. 3, 2002

(86) PCT No.: PCT/JP02/08934

§ 371 (c)(1),
(2), (4) Date: Jun. 10, 2004

(87) PCT Pub. No.: WO03/050588

PCT Pub. Date: Jun. 19, 2003

(65) Prior Publication Data

US 2005/0018318 A1    Jan. 27, 2005

(30) Foreign Application Priority Data

Dec. 13, 2001   (JP) .............................. 2001-379490

(51) Int. Cl.
*H05H 3/04*    (2006.01)

(52) U.S. Cl. ..................................................... 250/251
(58) Field of Classification Search ..................... None
See application file for complete search history.

(56) References Cited

U.S. PATENT DOCUMENTS 4,666,256 A    5/1987    Shimizu et al.

FOREIGN PATENT DOCUMENTS

| EP | 0 490 697 A1 | 6/1992 |
|----|---|---|
| JP | 05-93871 A | 4/1993 |
| JP | 06-123886 A | 5/1994 |
| JP | 08-230375 A | 9/1996 |
| JP | 2001-62792 A | 3/2001 |
| JP | 2001-147374 A | 5/2001 |
| JP | 2001290083 A * | 10/2001 |

OTHER PUBLICATIONS

Fallman et al., "Design for fully steerable dual-trap optical tweezers", Applied Optics, vol. 36, No. 10, Apr. 1, 1997, pp. 2107-2113.*

(Continued)

*Primary Examiner*—Jack I. Berman
(74) *Attorney, Agent, or Firm*—Rader, Fishman & Grauer PLLC

(57) ABSTRACT

The trapping force reinforcing optical system that enables optical tweezers to trap micro particles under water securely, without contact and non-invasively using a laser beam.

The optics of the optical tweezers comprises an additional lens system movable along an optical axis, and a spherical aberration of a collector lens is controlled by moving the additional lens system along the optical axis.

12 Claims, 5 Drawing Sheets

The additional lens system is moved toward the light source.

A-Arrow View

OTHER PUBLICATIONS

R. N. Watts and C. E. Wieman, "Manipulating atomic velocities using diode lasers," Optics Letters, May 1986, vol. 11, No. 5, USA.

A. Ashkin, J. M. Dziedzic, J. E. Bjorkholm, and Steven Chu, "Observation of a single-beam gradient force optical trap for dielectric particles," Optics Letters, May 1986, vol. 11, No. 5, USA.

* cited by examiner

The additional lens system is moved toward the light source.

A-Arrow View

The additional lens system is moved away from the light source.

The additional lens system is adapted to a beam expander that uses an ordinary laser light source and is moved away from the light source.

The abbreviated optical system of optical tweezers

OPTICAL SYSTEM FOR REINFORCING OPTICAL TWEEZERS CAPTURING FORCE

TECHNICAL FIELD

The present invention relates to a trapping force reinforcing optical system that enable optical tweezers to trap micro particles under water securely, without contact and non-invasively using a laser beam.

BACKGROUND ART

Optical tweezers are a means of trapping micro particles underwater without contact and non-invasively using laser beams that are converged by an objective of a large numerical aperture. The principle was first announced by Ashkin in 1986 and was then followed by research on practical applications. At present, a variety of related devices and systems are available in the market.

Optical tweezers are a valuable tool in biological and physical research. In actual applications, however, it is often difficult to control and use the optical tweezers to trap micro particles.

Conventional optical tweezers are briefly described below. FIG. 5 shows the optics of optical tweezers.

In FIG. 5, 101 denotes the laser fiber light source, 102 the collector lens (collimating lens), 103 the surface reflecting mirror M1, 104 the convergent convex lens, 105 the focal plane of the imaging lens, 106 the surface reflecting mirror M2, 107 the imaging lens, 108 the objective and 109 the specimen.

Near-infrared rays from the laser fiber light source (101) pass through the collector lens (102) to become a flux of parallel rays, which are reflected by the surface reflecting mirror (103), and then converge on the focal plane of imaging lens (5) (first imaging plane). The illuminating light rays reflected by the surface reflecting mirror (106) turn into a flux of parallel rays as they pass through the imaging lens (107) and then converge on the specimen (109) (surface) via an objective (108).

Transparent particles (e.g., cells, latex beads, silica particles) with a refractive index greater than that of water are trapped by the known principle of laser beam convergence. Conventional optics allow the position of rays convergent on the specimen to be varied by tilting the surface reflecting mirror (103), thus allowing the researcher to trap particles at any desired position.

To simplify the optics, the flux of parallel laser beams is enlarged by a beam expander to fully cover the pupil diameter of the objective. This enables direct illumination of the objective and converges the rays on the specimen's surface. A detailed description of this procedure is omitted here.

Problems are experienced using the conventional optics shown in FIG. 5; beads of under several micrometers in size may not be trapped by the objective, and even when trapping is successful the trapping force sharply decreases when the particles are at a depth of 5 μm or more in the water, eventually resulting in trapping failures.

We investigated the reason why the trapping force deteriorates sharply for particles at depths of 5 μm or more in the water. The major cause of the problem is the increased spherical aberration that increases with the depth of the beads in the water due to refraction occurring at the interface between the water and glass (also called cover glass). The objective itself may also have residual spherical aberrations. To solve these problems, an objective with a specific spherical aberration that cancels other spherical aberrations in the system must be selected or some other suitable means must be taken.

The light pressure against a micro particle in water in the direction opposite to the light source increases with the decreasing angle with the optical axis (according to the law of conservation of momentum), and flicks the particle away (pushes the particle upward under an inverted microscope). This force works contrary to trapping, or in other words, weakens the trapping force.

Another possibly effective means of reinforcing the trapping force is increasing the laser output. When studying biological specimens under a microscope, however, the specimen is often damaged if near-infrared rays on the specimen exceed a few mW. This procedure is therefore not very practical.

To solve these problems, the inventors of the present invention studied the means of reinforcing the trapping force and found that optical systems with excellent trapping force had a spherical aberration in the positive (+) direction, as evidenced in the captured Point Spread Function (PSF) images (Japan Science and Technology Corporation, Apr. 5, 2001; Megumu Shio and Kazuhiko Kinosita CREST Team 13, "Evaluation Report on Water Immersion Objective").

Based on this knowledge, additional experimental optics where the spherical aberration occurs in any desired direction in the illumination system were constructed and incorporated in the original optics, with the expectation that the spherical aberration on the convergent plane of the objective would be, when properly adjusted, always in the plus (+) direction. If this approach was successful, any objective could be used without the necessity of careful selection, including one with a spherical aberration in the negative (−) direction. As a result of the experiments, the above design of the additional optics proved effective even when spherical aberration in the water proportional to the depth of the beads in the water increased due to refraction at the interface between the water and glass (also called cover glass). The inventors furthermore cut off the light at the center part of the spread light flux area (a 10 to 20% reduction by area) located after the additional optics, and found that the light pressure vector in the direction of flicking the particle away had decreased. The trapping force in the 3-D dimensions also improved substantially.

The present invention is based on the above research. It provides trapping force reinforcing optical system that are not restricted by the need to select particular objectives or use water immersion objectives which have a limited range of numerical apertures. The present invention allows the use of ordinary objectives of a large numerical aperture favorable for fluorescence observation, thereby solving the problems of optics in conventional optical tweezers.

Compared with conventional optical tweezers, the optical tweezers of the present invention considerably reduce harmful near-infrared rays assuming the same trapping force, or considerably reinforce the trapping force assuming the same output. It is possible to provide attachment-type (add-on type) optical tweezers featuring the characteristics of the present invention that can be realized in currently marketed optical tweezers. It is also possible to control the optical tweezers while performing total internal reflection fluorescence microscopy (using the evanescent field).

DISCLOSURE OF THE INVENTION

To achieve the above purpose, the present invention uses the following means of technical resolution:

The trapping force reinforcing optical system for optical tweezers, wherein, in the optics of the optical tweezers, an additional lens system movable along the optical axis is positioned on the optical axis between the laser light source and collector lens, and the spherical aberration of the collector lens is controlled by moving the additional lens system along the optical axis;

The trapping force reinforcing optical system for optical tweezers, wherein a tiltable spot mirror may be positioned behind the collector lens to cut off the laser beam at the center part;

The trapping force reinforcing optical system for optical tweezers, wherein the light cutoff area on the spot mirror may comprise deposited aluminum or another substance of a high reflectance;

The trapping force reinforcing optical system for optical tweezers, wherein, in the optics of the optical tweezers, an additional lens system movable along the optical axis may be positioned on the optical axis between the laser light source and collector lens, and the spherical aberration of the collector lens may be controlled by moving the additional lens system along the optical axis and at the same time a spot mirror may be positioned behind the collector lens to cut off the laser beam at the center part and enhance the trapping force through synergistic effects;

The trapping force reinforcing optical system for optical tweezers, wherein the additional lens system (3) can be detachably attached to the trapping force reinforcing optical system;

The trapping force reinforcing optical system for optical tweezers, wherein, in the optics of the optical tweezers provided with a beam expander, an additional lens system movable along the optical axis may be positioned on the optical axis between the lenses comprising the beam expander, and the spherical aberration of the beam expander may be controlled by moving the additional lens system along the optical axis;

The trapping force reinforcing optical system for optical tweezers, wherein a tiltable spot mirror may be positioned behind the beam expander to cut off the laser beam at the center part; and The trapping force reinforcing optical system for optical tweezers, wherein the light cutoff area on the spot mirror may comprise deposited aluminum or another substance of a high reflectance.

The present invention may furthermore provide a trapping force reinforcing optical system for optical tweezers, wherein, in the optics of the optical tweezers provided with a beam expander, an additional lens system movable along the optical axis may be positioned on the optical axis between the lenses comprising the beam expander, and the spherical aberration of the beam expander may be controlled by moving the additional lens system along the optical axis, and at the same time a spot mirror may be positioned behind the beam expander to cut off the laser beam at the center part of the laser bean and enhance the trapping force through synergistic effects; and The trapping force reinforcing optical system for optical tweezers, wherein the additional lens system (3) can be detachably attached to the trapping force reinforcing optical system.

BEST MODE OF IMPLEMENTING THE INVENTION

Figures 1A, 1B:
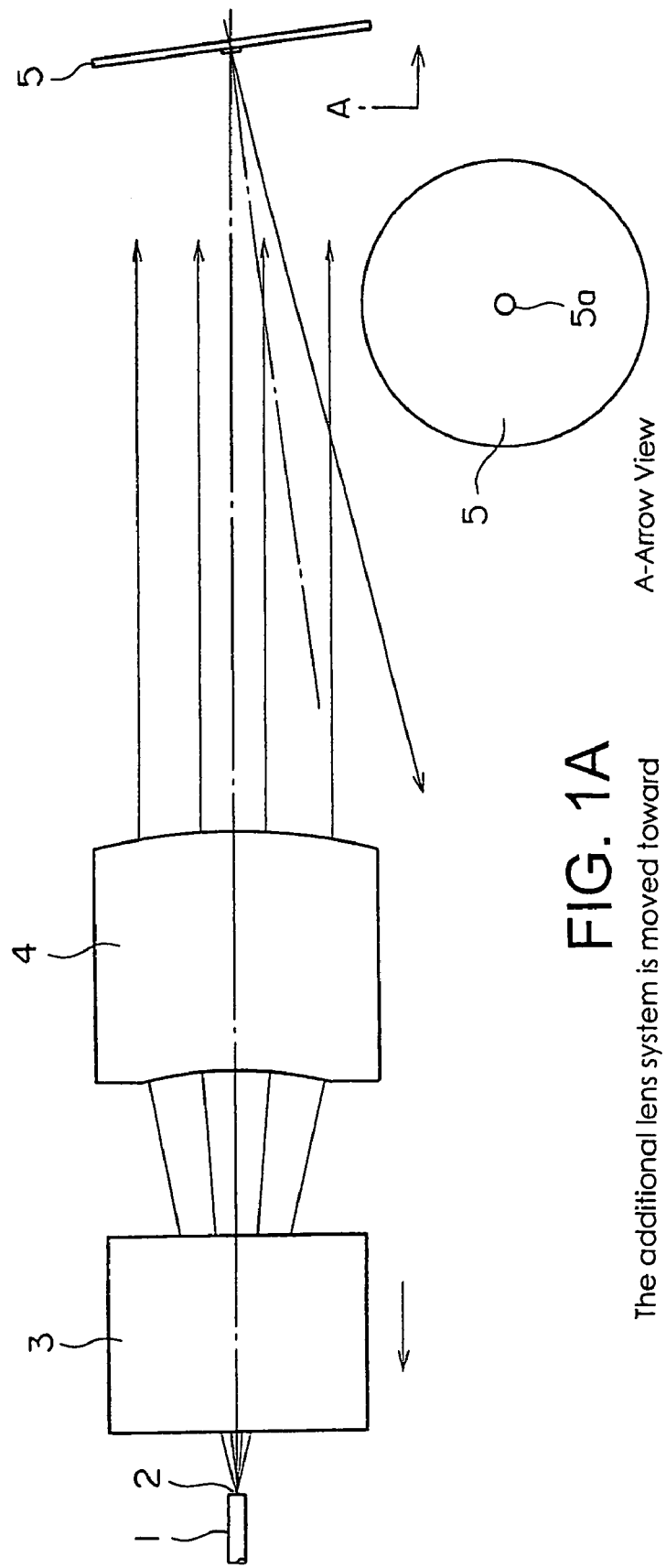
FIGS. 1A and 1B show an optical system of the present invention where the additional lens system is moved toward the light source.
Figure 2:
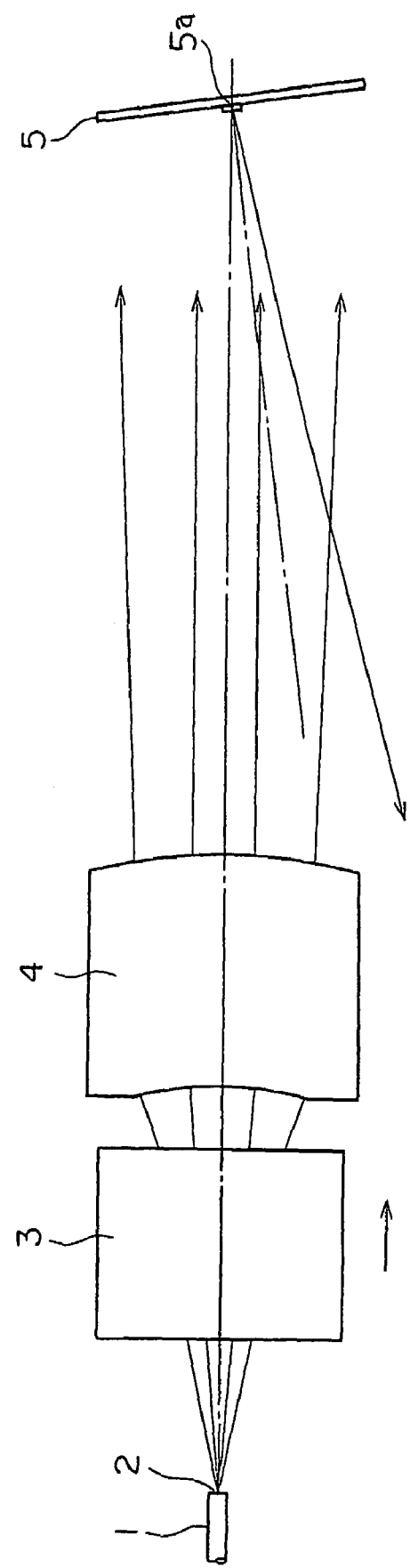
FIG. 2 shows an optics of the present invention where the additional lens system is moved away from the light source.

The principle of the optics of the present invention is described in the following referring to the drawings. FIGS. 1A and 1B shows the optics of the present invention where the additional lens system is moved toward the light source. FIG. 2 shows the optics of the present invention where the additional lens system is moved away from the light source.

In FIGS. 1A, 1B and 2, 1 denotes the laser fiber light source, 2 the emission port, 3 the additional lens system, 4 the collector lens and 5 the spot mirror. These components are arranged as shown in the figures. The additional lens system (3) moves along the optical axis, between the emission port (2) and the collector lens (4), as driven by a suitable known means of travel (not shown). The additional lens system is mounted on and removed from the optical axis using a suitable means of attachment.

The compound focal distance of the additional lens system (3) is infinity (no power lens). The additional lens system consists of two or more lenses of a curvature with total spherical aberration that increases as a ray moves away from the center part of the optical axis relative to the paraxial rays. To introduce the spherical aberration with the additional lenses, we adopted the same principle as disclosed in the U.S. Pat. No. 4,666,256 issued in 1994.

As shown in FIG. 1A, when the additional lens system (3) is brought closer to the light source, the near-infrared rays emitted from the laser fiber light source (1) pass through the additional lens system (3) and reach the collector lens (4). Since the emission port (2) and the additional lens system (3) are close to each other, the light rays passing through the shell near the emission port (2) are a small distance from the optical axis center part and thus only a small amount of negative (−) spherical aberration is generated.

In FIG. 2, when the additional lens system is moved away from the light source, the additional lens system (3) is farther from the emission port (2). As a result, the light rays passing through the shell are farther from the center part of the optical axis, and thus the positive (+) spherical aberration increases for the collector lens (4).

The trapping force of optical tweezers decreases sharply when the micro particles are at a depth of 5 μm or more in the water. This is mainly because of the increased spherical aberration proportional to the depth of the micro particles (beads) in the water, which is caused by refraction at the interface between the water and glass (also called cover glass)

In the present invention, to avoid the increased spherical aberration proportional to the water depth, the additional lens system (3) is positioned immediately before the collector lens (4) as shown in FIGS. 1A, 1B and 2. By moving the additional lens system (3) along the optical axis, an arbitrary level of spherical aberration occurs on the light source side. By controlling the spherical aberration in this way, the trapping force can be increased when trapping micro particles in a solution with converging rays because the negative direction in which spherical aberration increases proportional to the depth of the beads in the water is converted into the same convergence as the positive (+) spherical aberration (as a total optical system).

To increase the trapping force, spot mirror (5) is used in the present invention as shown in FIGS. 1A, 1B and 2. The spot mirror (5) is equipped with a means of tilting it (not shown) to control the angle of reflection.

Spot mirror (5) is designed to cut off light at the center part of the pupil diameter of the objective (not shown) (a 10 to 20% reduction by area). This is to reduce the light pressure vector acting on the micro particles in the water in the direction opposite to the light source. Reducing this vector is equivalent to increasing the trapping force.

Spot mirror (5) is a reflector in which the center part or central area 5a comprises, as shown, deposited aluminum or another substance of high reflectance to cut off the light. The central area 5a is approximately 10 to 20% of all light flux. (Thermal damage can occur if light-absorbing substances are used to cut off the light). Spot mirror (5) is typically installed in a position where the light flux spreads with an inclination of 5 to 10 degrees. This is effective for avoiding problems caused by the return of the light. The spot mirror maybe tilted manually, with a screw or motor-driven mechanism or by any other suitable means. As a result, the loss of laser output due to the spot mirror (5) is as low as 10 to 20%. The trapping force dramatically increases through synergistic effects with the above the additional lens system (3).

Figures 3A, 3B:
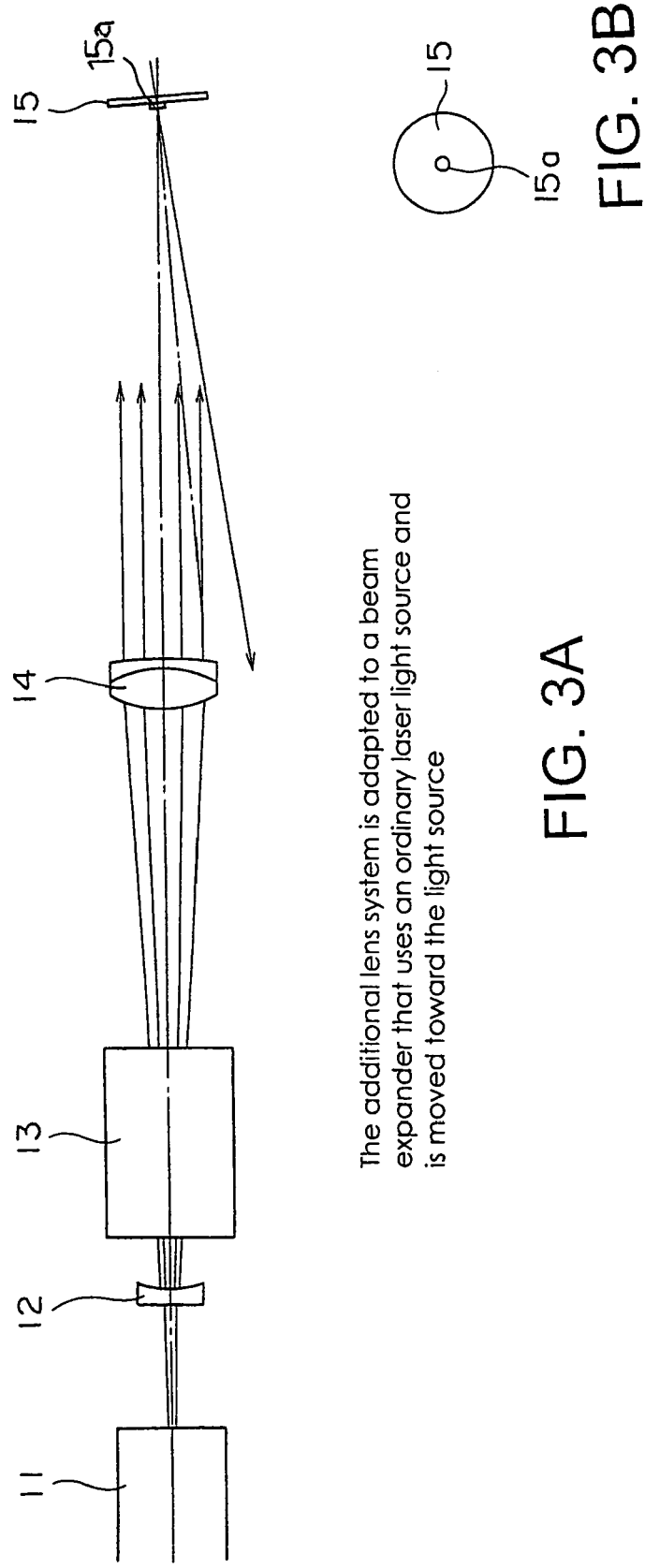
FIGS. 3A and 3B show a principle of the present invention is adapted to a beam expander that uses an ordinary laser light source; the additional lens system is moved toward the light source.
Figure 4:
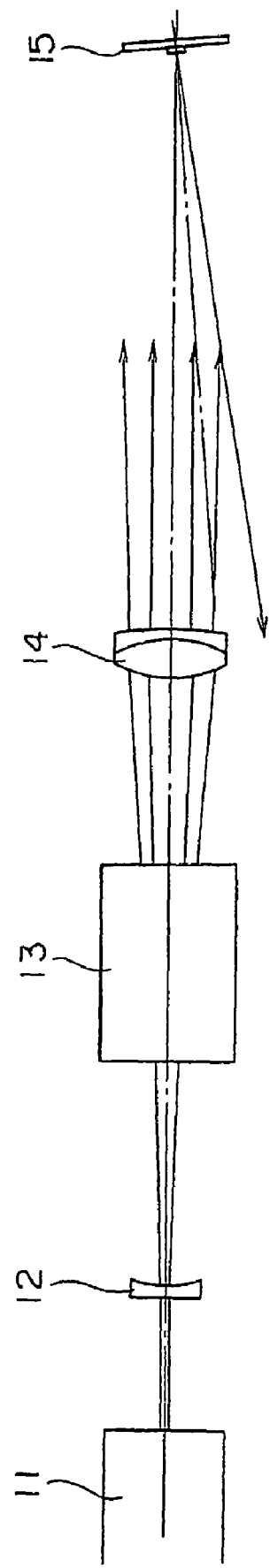
FIG. 4 shows a principle of the present invention is adapted to a beam expander that uses an ordinary laser light source; the additional lens system is moved away from the light source.
Figure 5:
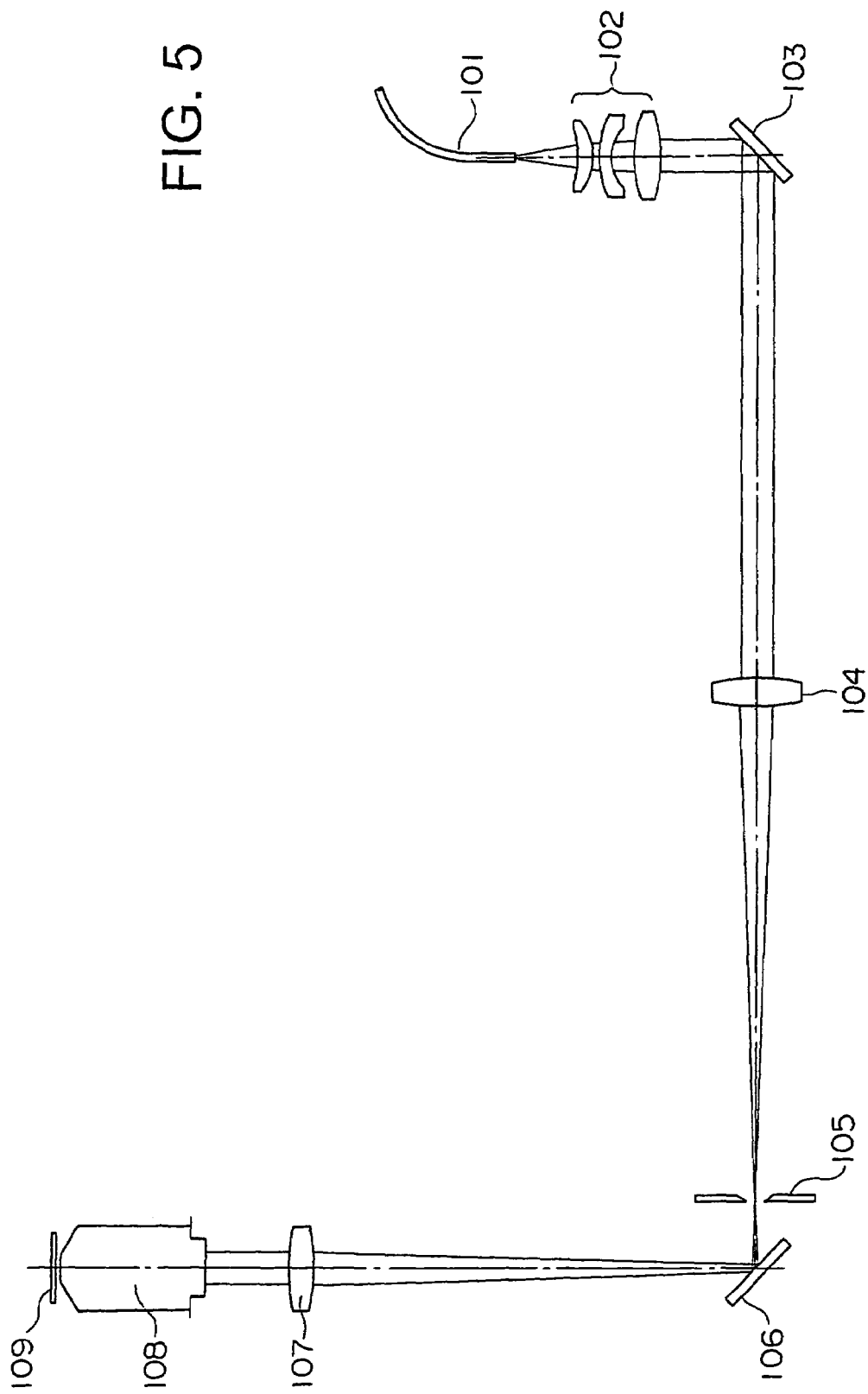
FIG. 5 shows a structure of conventional optical tweezers.

Examples of adapting the principle of the present invention to beam expanders that use ordinary laser light sources are described below referring to FIGS. 3A, 3B and 4.

In FIGS. 3A, 3B and 4, 11 indicates the laser light source, 12 the beam expander concave lens, 13 the additional lens system, 14 the beam expander convex lens, and 15 the spot mirror.

An ordinary beam expander consists of an inverted microscope with a concave lens 12 and convex lens 14. The additional lens system 13 is assembled into the inverted microscope, or between the concave lens 12 and convex lens 14 of the beam expander.

The principle of occurrence of spherical aberration in the illumination system is the same as shown in FIGS. 1 and 2. (The compound focal distance of the additional lens system is infinity. The additional lens system consists of two or more lenses of a curvature with total spherical aberration which increases as a ray moves away from the center part of the optical axis relative to the paraxial rays.) Other principles and functions are also the same as shown in FIGS. 1A, 1B and 2, and thus further detailed description is omitted.

Working examples have been described above. The additional lens system means of travel, the spot mirror tilting mechanism and any other means and mechanisms are not limited to that shown above but any other means and mechanisms can be adopted to the extent that the same or similar functions are achieved. Furthermore, the present invention maybe implemented in various other forms or embodiments without deviating from the spirit of the main features of the present invention. The above-mentioned embodiments are therefore only a few examples and should not be construed as limiting.

INDUSTRIAL APPLICABILITY

With conventional optical tweezers, the spherical aberration increases in proportion to the depth of the micro particles (beads) in water due to refraction at the interface between the water and glass with the result that the trapping force sharply decreases when the particles are at a depth of 5 μm or more in the water. When using the optical tweezers of the present invention, micro particles at depths of 100 μm or more in water can be trapped even when using an oil immersion objective of a large numerical aperture, thereby expanding the area of biological research.

Conventionally, trapping underwater micro particles and moving them to a depth of 5 μm or more in the water requires exposure of the specimen to near-infrared rays exceeding several mW, which may damage the specimen in many cases. By using the optical tweezers of the present invention, the harmful near-infrared rays can be prodigiously decreased assuming the same trapping force. This expanded the research area for researchers observing biological specimens.

It is possible to decrease the light pressure in the direction opposite to the light source that acts on the underwater micro particles. The trapping force is remarkably reinforced three-dimensionally assuming the same laser power on the specimen.

Researchers are not restricted by the need to select particular objectives favorable for trapping or to use water immersion objectives that prohibit objective type total internal illumination.

Conventional optical tweezers are available in the market and are used extensively. It is possible to provide attachment-type (add-on) units based on the present invention to be installed on existing and currently marketed conventional optical tweezers.

The invention claimed is:

1. A trapping force reinforcing optical system for optical tweezers, comprising an additional lens system movable along an optical axis positioned on the optical axis between a laser light source and a collector lens, a spherical aberration of the collector lens is controlled by moving the additional lens system along the optical axis,
   wherein a tiltable spot mirror having a light cutoff area is positioned behind the collector lens to cut off a laser beam at a center part of the laser beam.

2. The trapping force reinforcing optical system for optical tweezers as stated in claim 1, wherein the light cutoff area on the spot mirror comprises deposited aluminum or another substance of a high reflectance.

3. A trapping force reinforcing optical system for optical tweezers, comprising an additional lens system that is movable along an optical axis and is positioned on the optical axis between a laser light source and a collector lens, a spherical aberration of the collector lens is controlled by moving the additional lens system along the optical axis and at the same time a spot mirror is positioned behind the collector lens to cut off the laser beam at a center part of the spot mirror and to enhance a trapping force through synergistic effects.

4. The trapping force reinforcing optical system for optical tweezers as stated in any of claims 1 through 3, wherein the additional lens system is detachably attached to the trapping force reinforcing optical system.

5. The trapping force reinforcing optical system for optical tweezers as stated in claim 3, wherein collector lens comprises a beam expander.

6. The trapping force reinforcing optical system for optical tweezers as stated in claim 3, wherein the light cutoff area on the spot mirror comprises deposited aluminum or another substance of a high reflectance.

7. The trapping force reinforcing optical system for optical tweezers as stated in claim 5, wherein the light cutoff area on the spot mirror comprises deposited aluminum or another substance of a high reflectance.

8. The trapping force reinforcing optical system for optical tweezers as stated in claim 5, wherein the additional lens system is detachably attached to the trapping force reinforcing optical system.

9. A trapping force reinforcing optical system for optical tweezers comprising a beam expander and an additional lens system, wherein the additional lens system is movable along an optical axis and is positioned on the optical axis between lenses of the beam expander, and a spherical aberration of the beam expander is controlled by moving the additional lens system along the optical axis, and wherein a tiltable spot mirror is positioned behind the beam expander to cut off the laser beam at a center part of the laser beam.

10. The trapping force reinforcing optical system for optical tweezers as stated in claim 9, wherein a light cutoff area on the spot mirror comprises deposited aluminum or another substance of a high reflectance.

11. A trapping force reinforcing optical system for optical tweezers comprising a beam expander and an additional lens system is movable along an optical axis, the additional lens system is positioned on the optical axis between lenses of the beam expander, a spherical aberration of the beam expander is controlled by moving the additional lens system along the optical axis, and a spot mirror is positioned behind the beam expander to cut off a laser beam at a center part of the laser beam and to enhance the trapping force through synergistic effects.

12. The trapping force reinforcing optical system for optical tweezers as stated in any of claims 9 through 11, wherein the additional lens system is detachably attached to the trapping force reinforcing optical system.

* * * * *